(12) United States Patent
Pitzer

(10) Patent No.: US 6,471,871 B1
(45) Date of Patent: Oct. 29, 2002

(54) METHOD FOR THE REMOVAL OF SILICON AND HEAVY METALS FROM AQUEOUS STREAMS

(75) Inventor: Charles L. Pitzer, Wilmington, NC (US)

(73) Assignee: Finnchem USA, Inc, Eastover, SC (US)

( * ) Notice: Subject to any disclaimer, the term of this patent is extended or adjusted under 35 U.S.C. 154(b) by 47 days.

(21) Appl. No.: 09/697,220

(22) Filed: Oct. 26, 2000

Related U.S. Application Data

(60) Provisional application No. 60/161,971, filed on Oct. 28, 1999.

(51) Int. Cl.[7] .................................................. C25B 1/26
(52) U.S. Cl. ........................ 210/712; 205/502; 205/503; 210/724; 210/726; 210/737; 210/912; 210/913; 423/475
(58) Field of Search .................................. 205/502, 503; 210/710, 712, 724, 726, 737, 912, 913; 423/475, 478

(56) References Cited

U.S. PATENT DOCUMENTS

| | | | | |
|---|---|---|---|---|
| 4,005,009 A | * | 1/1977 | Kinoshita et al. | 210/705 |
| 4,260,491 A | * | 4/1981 | Cassidy et al. | 210/720 |
| 4,655,934 A | | 4/1987 | Rose | |
| 4,702,805 A | * | 10/1987 | Burkell et al. | 205/503 |
| 4,773,974 A | * | 9/1988 | Dobosz | 423/597 |
| 4,795,585 A | | 1/1989 | Becker | |
| 5,211,853 A | * | 5/1993 | Jackson et al. | 204/DIG. 13 |
| 5,250,189 A | | 10/1993 | Rey | |
| 5,292,406 A | * | 3/1994 | Wanngard et al. | 205/349 |
| 5,354,435 A | * | 10/1994 | Kaczur et al. | 423/478 |
| 5,453,206 A | * | 9/1995 | Browne | 210/711 |
| 5,681,446 A | * | 10/1997 | Betts et al. | 205/503 |
| 5,871,648 A | * | 2/1999 | Allen et al. | 210/638 |

* cited by examiner

*Primary Examiner*—Peter A. Hruskoci
(74) *Attorney, Agent, or Firm*—Andrew E. Pierce

(57) ABSTRACT

A batch or continuous process for the removal by flocculation of silicon and heavy metal contamination from aqueous waste streams by the addition of an aluminum salt, particularly, aqueous streams recycled as electrolyte in the electrolytic production of alkali metal or alkaline earth metal chlorates. The process is particularly suited to the removal of heavy metals and silicon contamination in an electrolyte recycled to an electrolytic cell subsequent to the removal by crystallization of a chlorate salt. An aluminum salt, such as aluminum chloride, aluminum chlorohydrate, and polyaluminum chlorides including polyaluminum chloride sulfates is effective as a flocculating agent.

3 Claims, 1 Drawing Sheet

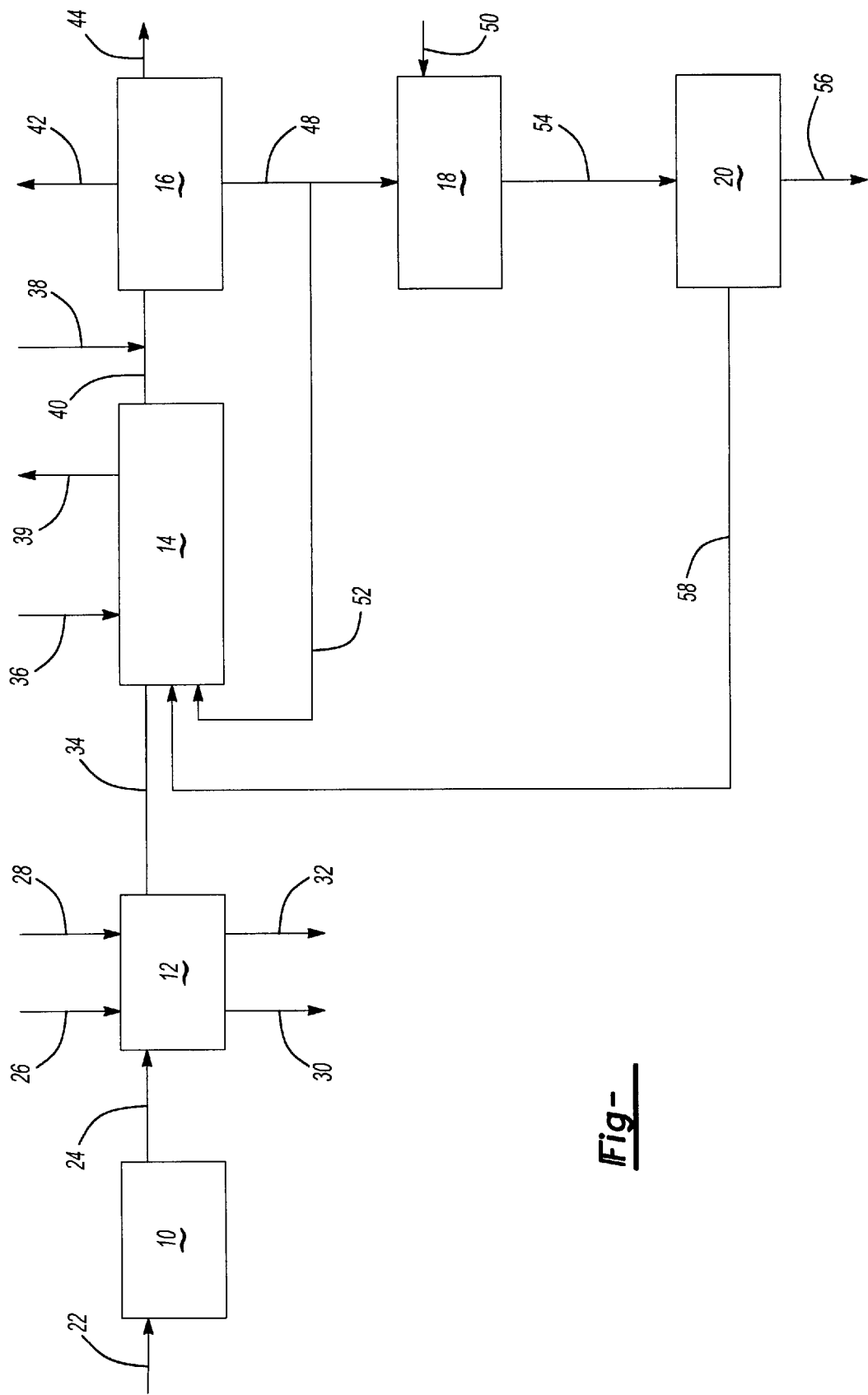
Fig -

METHOD FOR THE REMOVAL OF SILICON AND HEAVY METALS FROM AQUEOUS STREAMS

CROSS REFERENCE TO RELATED APPLICATIONS

The benefit of the filing date of Provisional Application No. 60/161,971, filed Oct. 28, 1999, is claimed.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION (1) Field of the Invention

This invention relates to a process for the removal of silicon and heavy metals from aqueous streams.

(2) Description of Related Art

It is known in the water treatment art to utilize polyaluminum salts such as polyaluminum chloride, polyaluminum sulfate, and polyaluminum chloride sulfate as flocculating agents for the treatment of both potable and waste water. For example, in U.S. Pat. No. 3,544,476 the use of a polyaluminum chloride is described as a coagulant. These aluminum salts have also been utilized in combination with an effective amount of a polymeric flocculant such as a polyacrylamide, copolymers of acrylic acid and acrylamide, and polymethacrylamide in the treatment of circulating water from a paint spray booth system, as described in U.S. Pat. No. 5,250,189. A method of clarifying waters containing turbidity causing components utilizing a low basicity polyaluminum chloride in combination with a water soluble cationic polymer is described in U.S. Pat. No. 4,655,934, and a water treatment composition containing a polyaluminum salt and polyvinyl alcohol is described in U.S. Pat. No. 4,795,585.

Industrial waste waters discharged from metal refinery works, plating shops, metal processing shops, etc., generally, contain not only heavy metals such as cadmium, chromium, manganese, mercury, etc., but also amounts of iron, titanium, zinc, and silicon. To discharge such waste waters without subjecting them to purification is destructive of the environment. Accordingly, such waste waters are treated by means of a flocculation process.

In the electrochemical art electrolyte is often recirculated for further reaction through an electrochemical cell line after the desired reaction product is drawn off. Accordingly, heavy metal impurities upon such recycling tend to build up in concentration in the electrochemical cell and have a deleterious effect upon the electrodes in that the heavy metal impurities tend to deposit upon the surface of the electrodes which results in a necessary increase in electrical power to overcome the effect of the metal impurity coating.

Heretofore, it has been conventional in the production of sodium chlorate to pass the recirculated electrolyte containing silicon and heavy metal contamination through an ion exchange column containing a resin suitable for removing heavy metals and silicon contamination therein. While this method of removing silicon and heavy metals from an electrolyte may be suitable for certain electrochemical processes, it is unsuitable for a process in which the electrolyte contains an oxidizing agent such as sodium chlorate. This is because it is known that certain oxidizing agents are reactive with the resins utilized in the ion exchange column, in addition, certain of the heavy metals may act as catalysts for the oxidation reaction between the sodium chlorate and the ion exchange resin resulting in the occurence of a fire or even an explosive reaction. Accordingly, it is particularly important to avoid the removal of silicon and heavy metal contamination in an electrolyte prior to recirculating the electrolyte back to the electrochemical cell lines for further production of sodium chlorate.

Sodium chlorate is conventionally produced by the electrolysis of an aqueous solution of sodium chloride in an undivided electrolytic cell. The extent of electrolysis is controlled to produce a product from the cell in which the sodium chlorate and sodium chloride have a desired ratio usually in the range of 1:1 to about 20:1 and, preferably, in the range of about 2:1 to about 15:1. Generally, the aqueous solution obtained after electrolysis is processed to crystallize out the sodium chlorate and the aqueous solution remaining, the mother liquor, is recycled to the electrolytic cell utilizing make-up sodium chloride to produce additional sodium chlorate. It is this aqueous solution which must be purified to remove silicon and heavy metals m order to maintain the electrical efficiency of the electrolytic cell. In addition to contamination with silicon and heavy metals, the electrolyte, also known as cell liquor, contains significant amounts of chromate ions. The removal of chromate ions from the sodium chlorate cell product before the sodium chlorate is used in the production of chlorine dioxide for use in the bleaching of chemical cellulosic pulps is set forth in U.S. Pat. No. 5,211,853, assigned to Huron Tech Corp, Delco, N.C.

BRIEF SUMMARY OF THE INVENTION

In accordance with the present invention, there is provided a procedure for removal of silicon and heavy metals from an electrochemical process for the production of sodium chlorate. Alternatively, the procedure is applicable to the removal of silicon and heavy metal contamination from aqueous streams. In the preferred process for removal of silicon and heavy metals from an electrochenical process for the production of sodium chlorate, the mother liquor after sodium chlorate crystallization is treated with an aluminum salt, preferably, aluminum chlorohydrate to precipitate a portion of the silicon impurity and heavy metal contamination from the mother liquor.

Accordingly, in one aspect of the present invention, there is provided a means of removing silicon and heavy metals from a mother liquor which is recycled to an electrochemical cell subsequent to cry tion of sodium chlorate and removal thereof A process for the prepration of sodium chlorate comprises (1) electrolyzing an aqueous solution of sodium chloride to form an aqueous solution of sodium chlorate and sodium chloride, (2) crystallizing sodimn chlorate from the aqueous solution of sodium chlorate and sodium chloride to form a mother liquor and sodium chlorate crystals, (3)

separaing sodium chlorate crystals from the mother liquor, (4) adding make-up sodium chloride solution to the mother liquor to form a feed solution, and recycling the feed solution to an electrolyzing step. The improvement of the invention comprises treating at least a portion of the mother liquor with an aluminum salt, preferably, aluminum chlorohydrate to precipitate a part of the silicon and heavy metal contamination therein, separating the precipitate thus formed containing a portion of the silicon and heavy metal content of the mother liquor, and subsequently recycling the treated portion of the mother liquor to the electrolyzing step.

A batch or continuous process for the removal of silicon and heavy metal contamination in the mother liquor is contemplated, with a continuous process preferred, in which the rate of removal of the silicon and heavy metal impurity present in the mother liquor is adjusted to match the rate of sodium chlorate formation occuring in the electrochemical cell and the subsequent crystallization of sodium chlorate from the cell liquor to produce the mother liquor. Typically, removal efficiencies of about 50 percent of the silicon present in the mother liquor and higher proportions of removal of the heavy metals are sufficient to maintain the electrical efficiency of the process for sodium chlorate production.

BRIEF DESCRIPTION OF DRAWING

The FIGURE is a block diagram flow sheet of a sodium chlorate production process in accordance with one embodiment of the invention.

A sodium chlorate production process partially simplified and modified in accordance with one embodiment of the present invention is illustrated schematically in the FIGURE. The sodium chlorate production process involves feeding through line 22 raw brine into raw brine tank 10. Raw brine is fed through line 24 to hardness removal equipment 12 into which aqueous sodium carbonate and aqueous sodium hydroxide are fed through lines 26 and 28 respectively. Calcium carbonate and magnesium hydroxide are removed through lines 30 and 32 from hardness removal equipment 12. The resulting purified stream from hardness removal equipment 12 is fed through line 34 to the cell lines 14 for electrolysis of the aqueous sodium chloride solution to form sodium chlorate. Hydrochloric acid is fed through line 36 to the cell lines 14 to control the pH of the electrolysis process. Hydrogen produced during the electrolysis process is vented from cell lines 14 through line 39.

An aqueous solution of sodium chlorate and sodium chloride resulting from the electrolysis process is removed from the cell lines 14 usually after dehypoing treatment, for example, with urea or hydrogen peroxide fed to the cell lines through line 38. The dehypoed aqueous solution of sodium chlorate and sodium chloride is passed through line 40 to a crystallization and separation step 16 wherein the aqueous solution is concentrated by evaporation to precipitate crystalline sodium chlorate which is removed through line 44. Water evaporated during the crystalliztion is removed through line 42.

The mother liquor from the crystalliztion step is passed through line 48 to a mother liquor tank 18. A portion of the mother liquor is passed through line 52 back to the cell line 14. The remainder of the mother liquor is treated with an aluminum salt, designated AlX, which is added to mother liquor tank 18 through line 50.

Subsequent to precipitation of a portion of the silicon and heavy metal content of the mother liquor, the precipitate thus formed is removed through line 54 to filtration equipment 20 and the precipitate is removed from filtration equipment through line 56 and the treated mother liquor having reduced silicon and heavy metal contamination is passed through line 58 back to the cell line 14.

DETAILED DESCRIPTION OF THE INVENTION

A batch or continuous process is disclosed for the removal of silicon and heavy metal contamination from aqueous waste streams, particularly, aqueous streams recycled as electrolyte in the electrolytic production of alkali metal or alkaline earth metal chlorates. The method of the invention is particularly suited to the removal of heavy metals and silicon contamination in an electrolyte recycled to an electrolytic cell subsequent to the removal by crystallization of a chlorate salt since thereby, it is possible to avoid the alternative method of removal of silicon and heavy metals from such an electrolyte by means of a column containing an ion exchange resin.

Unexpectedly, it has been found that an aluminum salt, such as aluminum chloride, aluminum chlorohydrate, and polyaluminum chlorides including polyaluminum chloride sulfates, is effective as a flocculating agent for the removal of water soluble contaminants in an aqueous stream such as an electrolyte which is recycled to an electrolysis cell subsequent to crystallization of the chlorate salt produced therein. It has been found that the efficiency of removal of soluble heavy metals and silicon contamination occurs most effectively at a pH of about 6.8 to about 7.2, preferably, at a pH of about 7. Improved removal of heavy metal and silicon contamination can occur if the process of the invention is conducted at elevated rather than ambient temperature. The removal of the precipitate formed can take place by any convenient means, preferably, by filtration at ambient or elevated temperature. Preferably, the filtration process is conducted at a temperature of about 60° C. to about 80° C., and, most preferably, at a temperature of about 70° C. when the resistance to elevated temperature of the processing equipment is taken into consideration.

The aluminum salts which are preferred for use in the process of the invention include aluminum chloride, aluminum chlorohydrate, and polyaluminum chloride. These inorganic coagulants can be utilized individually or in mixtures.

The amount of these inorganic coagulants is an effective amount which is sufficient for removing a substantial amount of the silicon and heavy metal contamination of the aqueous stream. Generally, the amount of inorganic coagulant is a stoichiometric amount based upon the silicon ion present in the aqueous strewn. The addition of substantially more than this amount does not result in removal of more of the silicon and heavy metal contamination, However, in order to insure that at least a stoichiometric amount of the alumino salt is present an additional amount of 10–20 percent over the stoichiometric amount is generally added to the aqueous stream for removal of silicon and heavy metal contaminants.

In the method of the invention, the aqueous stream is adjusted to a neutral pH, the aluminum salt is then added and the pH readjusted to neutrality. Stirring the mixture for a sufficient time to allow coagulation and flocculation to occur and allowing sufficient time for the coagulated material to settle is necessary prior to removing the precipitate, for instance, by filtration.

The method of the invention is particularly suited to the removal of silicon in a silicon contaminated aqueous stream. Generally, the addition of a stoichiometric amount of the aluminum salt to a silicon contaminated process stream results in the removal of about ½ of the silicon present. Subsequent treatment of the process strewn can result in the removal of additional amounts of silicon. The method of the invention is also particularly suited to the removal of contaminating amounts of titanium and zinc as well as other heavy metal contaminants.

Aluminum chlorohydrate having the formula $Al_2(OH)_5Cl.2H_2O$ is commercially available as a 50 percent aqueous solution having a specific gravity of 1.33 to 1.35 at 20° C., containing 23 to 24 percent aluminum oxide and a basicity of 75 to 90 percent. Aluminum chlorohydrate is prepared by electrolyzing a solution of suitable aluminum salts, as disclosed in U.S. Pat. Nos. 2,392,531 and 2,492,085.

Representative polyaluminum chloride compositions are disclosed in U.S. Pat. Nos. 3,544,476 and 3,270,001, each incorporated by reference.

Additional disclosure of useful polyaluminum chlorides can be found in U.S. Pat. Nos. 4,655,934 and 5,597,510, each incorporated by reference.

Useful polyaluminun chloride sulfates are disclosed in U.S. Pat. Nos. 5,518,706; 5,348,721; and 5,246,686, each incorporated by reference.

The following Examples illustrate the present invention and should not be construed, by implication or otherwise, as limiting the scope of the appended claims. Where not otherwise specified throughout this specification and claims, temperatures are given in degrees centigrade and parts, percentages, and proportions are by weight.

EXAMPLE 1 AND EXAMPLE 2
(Control)

A mother liquor solution produced in an electrolytic cell subsequent to crystallization of sodium chlorate containing 630 grams per liter of sodium chlorate and 70 grams per liter of sodium chloride, is placed in a 1 liter beaker in the amount of 500 milliliters and the pH is adjusted to 7.0. Aluminum chlorohydrate in the amount of 0.75 grams is added to the beaker and the pH is readjusted to 7.0. The mixture is stirred for 15 minutes and the precipitate which forms is allowed to settle to the bottom of the beaker for 30 minutes before the mixture is filtered through a 1 micron filter using a Buchner funnel. The filtrate was analyzed for heavy metals, silicon and aluminum. Analysis results are provided in Table I in which Example 2 is an untreated control.

The aluminum chlorohydrate used is a 50 percent aqueous solution having a specfic gravity at 20° C. of 1.33–1.35; a percent aluminum content of 12.2–12.7; a percent aluminum oxide ($Al_2O_3$) content of 23–24; a pH at 20° C. of a 15 percent solution of 4.0–4.4; and a basicity of 75–90 percent.

TABLE I

Total Ion Content Of Filtrate In Parts Per Million

| CATIONS | EXAMPLE 1 | EXAMPLE 2 (CONTROL) |
|---|---|---|
| Al | 2.8 | 2.8 |
| Fe | 0.03 | 0.185 |
| Cu | 0.02 | 0.08 |
| Ni | 0.017 | 0.045 |
| Si | 14.0 | 22.0 |
| Sn | <0.010 | 0.035 |
| Ti | <0.010 | 0.035 |
| Zn | 0.5 | 3.0 |

EXAMPLES 3–5 & EXAMPLE 6
(Control)

The procedure of Example 1 is repeated except that the process of Example 3 is conducted at a temperature of 30° C.; the process of Example 4 is conducted at a temperature of 60° C.; and the process of Example 5 is conducted at a temperature of 90° C. Analysis result are provided in Table II.

TABLE II

Total Ion Content Of Filtrate In Parts Per Million

| CATIONS | EXAMPLE 3 | EXAMPLE 4 | EXAMPLE 5 | EXAMPLE 6 (CONTROL) |
|---|---|---|---|---|
| Process Condition | 30° C. | 60° C. | 90° C. | — |
| Al | 0.64 | 11.9 | 3.3 | 0.52 |
| Fe | <0.01 | <0.01 | <0.01 | 0.087 |
| Cu | <0.010 | 0.014 | <0.01 | 0.090 |
| Ni | 0.012 | <0.01 | <0.01 | 0.036 |
| Pb | <0.01 | <0.01 | <0.01 | 0.012 |
| Si | 11.9 | 8.4 | 12.0 | 22.8 |
| Ti | 0.016 | 0.186 | 0.015 | 1.75 |
| Zn | 1.40 | 0.906 | 0.260 | 7.05 |
| Ca | 9.4 | 6.0 | 5.6 | 6.0 |
| Mg | 3.1 | 2.0 | 0.9 | 0.55 |

While this invention has been described with reference to certain specific embodients, it will be recognized by those skilled in the art that many variations are possible without departing from the spirit and scope of the invention and it will be understood that it is intended to cover all changes and modifications of the invention disclosed herein for the purposes of illustration which do not constitute departures from the spirt and scope of the invention.

What is claimed is:

1. A batch or continuous process for the removal of silicon and heavy metals from an electrolyte which is recycled to an electrolysis cell subsequent to removal by crystallization of a chlorate salt from said electrolyte, said process comprising:
   (A) adding an aluminum salt to said electrolyte,
   (B) reacting said aluminum salt with said electrolyte at an elevated temperature and a pH of about 6.8 to about 7.2 in order to precipitate silicon and heavy metals from said electrolyte, and
   (C) separating said precipitate from said electrolyte by filtration.

2. A process for the removal of silicon and heavy metal contamination from an electrolyte, said process comprising:
   (A) adding to said electrolyte an aluminum salt to form a precipitate comprising said silicon and heavy metals, and (B) separating said precipitate from said electrolyte wherein said aluminum salt is selected from the group consisting of aluminum chloride, aluminum chlorohydrate, polyaluminum chlorides, and polyaluminum chloride sulfates, said process is conducted at a pH of about 6.8 to about 7.2 and a temperature of about 60° C. to about 80° C., and said electrolyte is recycled to an electrolytic cell subsequent to removal by crystallization of a chlorate salt from said electrolyte.

3. The process of claim 2 wherein said aluminum salt is selected from the group consisting of aluminum chloride, aluminum chlorohydrate, and polyaluminum chloride.

* * * * *